United States Patent [19]

Wiklund et al.

[11] Patent Number: 4,837,717

[45] Date of Patent: Jun. 6, 1989

[54] DEVICE FOR MEASURING SUBSTANTIALLY VERTICAL, CIRCULAR-CYLINDRICAL OBJECTS

[75] Inventors: Rudolf Wiklund; Lars Ericsson, both of Täby, Sweden

[73] Assignee: Geotronics AB, Danderyd, Sweden

[21] Appl. No.: 10,678

[22] Filed: Feb. 4, 1987

[30] Foreign Application Priority Data

Feb. 4, 1986 [SE] Sweden ............................. 8600488
May 23, 1986 [SE] Sweden ............................. 8602358

[51] Int. Cl.⁴ ............................................. G01B 7/14
[52] U.S. Cl. ..................................... 364/563; 364/562; 356/3; 356/383; 356/384; 33/281; 33/290
[58] Field of Search .............................. 364/559–564; 356/3, 379–381, 383, 384; 33/1 N, 1 L, 281, 282, 285, 290, 292

[56] References Cited

U.S. PATENT DOCUMENTS

| 4,295,201 | 10/1981 | Wiklund | 364/561 |
| 4,531,052 | 7/1985 | Moore | 364/561 |
| 4,649,504 | 3/1987 | Krouglicof et al. | 364/559 |
| 4,660,982 | 4/1987 | Okada | 356/383 |
| 4,672,564 | 6/1987 | Egli et al. | 364/559 |

Primary Examiner—Parshotam S. Lall
Assistant Examiner—Brian M. Mattson
Attorney, Agent, or Firm—Pollock, Vande Sande & Priddy

[57] ABSTRACT

A measuring device measures the width of trees and other vertically disposed objects at a distance from these objects. An aiming instrument cites various points along the object and measures a distance to the object as well as provides a signal proportional to a plumb line angle sensor, a signal proportional to a horizontal angle device, and a distance measuring signal. A computer coupled to the aiming instrument will compute the diameter of the trees or other vertically disposed objects from the distance signal, angle sensor signal and horizontal angle device.

7 Claims, 2 Drawing Sheets

DEVICE FOR MEASURING SUBSTANTIALLY VERTICAL, CIRCULAR-CYLINDRICAL OBJECTS

The invention has been developed for measuring standing trees before harvesting, but it is obvious that the principles of the invention can also be used for measuring other types of vertical, circular-cylindrical objects, such as posts, columns, etc.

Instruments for measuring the length and width dimensions of a tree are already known by the name hypsometers. A hypsometer works according to the principle that the height of a tree can be calculated if the angles from the instrument to the top of the tree and to the root are known along with the distance to the tree trunk.

One difficulty with these known instruments is that the distance from the tree is measured with a measuring tape. The instrument is placed at a predetermined distance from the tree and the instrument is then aimed at the top of the tree and then at the root. The angular positions of the instrument are stored in a memory in a computer. The computer then calculates the length of the tree.

To determine the volume of the tree, the diameter of the tree must be measured at at least one location along its length. Previously this has been done by calipering, either by conventional calipering whereby the diameter, most often at chest height, is read on an analog or digital meter and then fed manually into the computer memory. The computer then computes the volume of the tree. Calipering is also occasionally done by digital dimensional measuring, from which the measuring result is fed, via an electronic interface, to the hypsometer computer.

The disadvantages of the hypsometer described above are that it requires so many manual measurements and that it must be placed at a predetermined distance from the tree. Since the calipering is carried out manually, it is difficult to perform in place other than a relatively small area close to the root.

The device according to the invention eliminates the above-mentioned problems. Further features of the device are also disclosed.

With the invention, it is now possible to carry out dimensional measurements of trees at suitable distances from the tree which are not predetermined. This in turn leads to more effective measurements since they are simplified. Since one needs only to set up the instrument in front of a tree to be measured to carry out all the measuring operations, it is possible to carry out the measurement process much more rapidly than previously. At the same time, the measurements are more accurate. From the same location it is possible to measure a plurality of trees. It is thus also possible to measure a significantly larger number of trees in a given time period.

The invention will now be described in more detail with reference to the accompanying drawings.

DESCRIPTION OF THE PREFERRED EMBODIMENT

Figure 1:
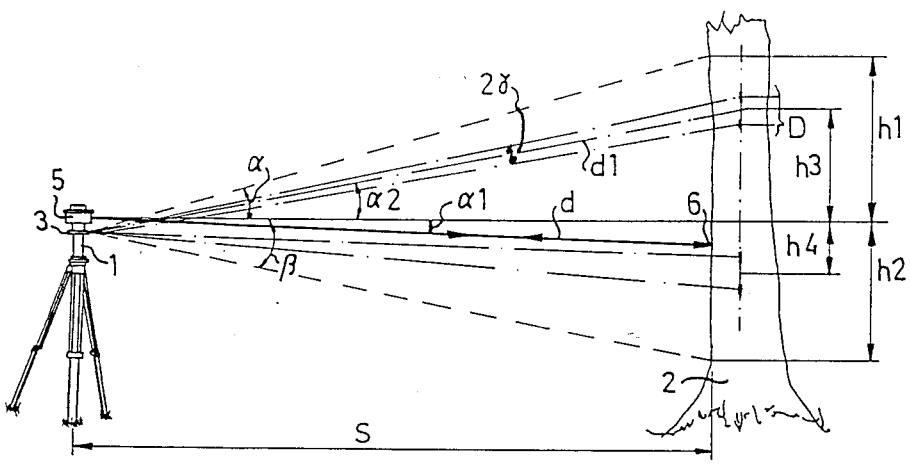
FIG. 1 shows schematically an instrument in the field with the angular position it can assume when measuring a tree.
Figure 2:
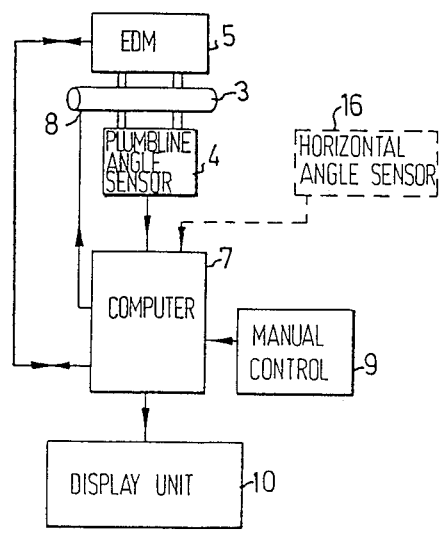
FIG. 2 shows a block diagram of one embodiment of the instrument according to the invention.

FIG. 1 shows an instrument according to the invention set up at a distance s from a tree 2. FIG. 2 shows a block diagram of the components included in the instrument 1. The instrument has a sight 3, a plumbline or vertical angle sensor 4 and an electronic distance meter 5 of an optical/electronic type, e.g. of phase-measuring type. FIG. 1 shows a reflector 6, e.g. a cube corner prisma, fixed to the tree. This is, however, not necessary if the distance meter is of the so-called direct measurement type. Direct-measuring distance meters are therefore preferable to facilitate work, since the operator does not need to fix reflectors to the trees, but it is more expensive and somewhat less exact than distance meters requiring reflectors placed on the target.

The sight 3, the plumbline angle sensor 4 and the distance meter 5 are coupled rigidly mechanically to each other. Signals are sent between the distance meter 5 and a computer 7, from the plumbline angle sensor 4 to the computer 7 and from the computer to a unit 8 in the sight. The unit 8 will be described in more detail below. To the computer, there are also coupled a manual control unit 9, e.g. a keyboard, as well as a display unit 10.

In the first distance measurement carried out, which is initiated from the control unit 9, thus causing the computer 7 to activate the distance meter 5, the distance to the tree in the direction (angle $\alpha 1$) which the instrument is set up, and the computer can now calculate the horizontal distance in a manner common to distance measuring instruments, with the aid of the distance obtained from the distance meter 5 and the signal from the plumbline angle sensor 4. This provides a signal which is solely dependent on the deviation of the aiming angle ($\alpha 1$) from the horizontal plane. Alternatively, it is possible to merely store the measurement values from the units 5 and 4 in a computer memory for later calculation.

After making distance measurement, the instrument is aimed by the operator, who sights through the sight 3, towards the top of the tree to a height which he deems the tree to be usable, and then towards the root at the height at which he deems the tree should be cut for felling. After each completed aiming of the instrument, the operator depresses a key on the unit 9 to store the plumbline angle sensor 4 value in question in the computer memory.

If the horizontal distance s to the tree is computed first, one obtains $h1 = s \times \tan \alpha$ and $h2 = s \times \tan \beta$, where $h1$ is the vertical distance from the horizontal plane to the top of the tree, $h2$ is the vertical distance from the horizontal plane to the root of the tree, $\beta$ is the angle obtained from the vertical angle sensor 4 when aiming at the top of the tree and $\beta$ is the angle from the sensor 4 when aiming at the root of the tree. The height of the tree $h = s \times (\tan \alpha + \tan \beta)$ is computed and stored in the computer memory.

If the horizontal distance s is not computed, the distance d obtained from the distance meter is used together with the vertical angle α1 in this measurement in accordance with the following formula for computing the height of the tree:

$$h = h1 + h2 = d \times \cos \alpha 1 \times (\tan \alpha + \tan \beta)$$

Of course, all of the measurement data can be stored in the memory of the computer 7 and all of the calculations can be carried out at a later occasion completed.

When computing the value of the tree and for judging for what it is to be used, not only its length is of interest. The quality of the stock is of crucial importance, making it possible to produce different final products. It is also essential to know the width of the tree, the absolute width and its conicity, so that the various dimensions can be used to measure the quality.

Figure 3:
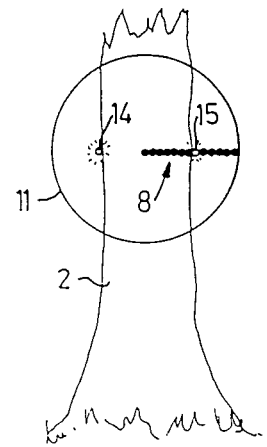
FIG. 3 shows schematically a tree and a view through the sight in a first embodiment of the instrument according to the invention.
Figure 4:
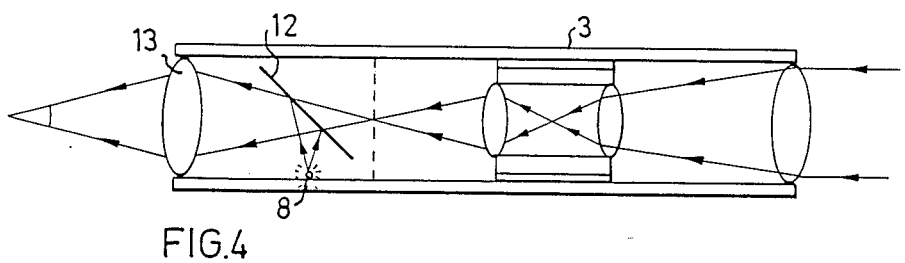
FIG. 4 shows schematically a longitudinal section through the sight in an embodiment of the instrument according to the invention.

This can be done by virtue of the fact that the instrument also comprises an optical caliper. An embodiment of such a caliper is shown in FIGS. 3 and 4. FIG. 3 shows a tree. Within the ring 11, there is shown what can be seen by the operator through the sight 3. As revealed in FIG. 4, the sight contains conventional optical elements, such as lenses. The sight shown in FIG. 4 is of standard type and is therefore not described in more detail here. The sight is only shown as an example; other types of sights are conceivable, such as Aimpoint type sights and the like.

Characteristic of the invention is that there is a horizontal angle determining unit placed in the sight to determine the angular distance between the boundary surfaces of the tree. FIGS. 3 and 4 show several LED's 8 arranged, which can be reflected into the beam path by means of a semi-transparent mirror 12 placed somewhere in the beam path, e.g. close to the ocular 13 of the sight so that it lies in an image plane. As can be seen in FIG. 3, one of the LED's is a reference point 14. FIG. 3 shows to the right a row of LED's 8 of which one 15 is lit. For calipering, the operator swings the instrument 1 horizontally so that the reference light point 14 in the sight is placed at one side of the tree. He can then turn a knob for example on the control unit 9, which causes the LED's 8 to be lit one by one in sequence, from the outside towards the center for example. When the LED 15 lights, which appears in the field of vision to be placed exactly at the other side of the tree, the calipering is finished. The operator indicates this by the manual control unit 9 and the computer 7 stores the information concerning which of the diodes 8 was lit. The distance between the diodes 14 and 15 corresponds directly to an angular distance as viewed from the instrument. The computer 7 also stores the output signal from the plumbline angle sensor 4 to compute the distance d1 from the instrument to the location on the tree where the calipering is done. If we assume that the calipering is done at a height h3 from the horizontal plane, then d1 = s/cos α2 is first computed. If the distance between the points 14 and 15 corresponds to an angle 2×γ, the diameter of the tree at the height h3 will be approximately:

$$D = 2 \times d1 \times \sin \gamma / (1 - \sin \gamma)$$

In order to obtain information concerning the width and conicity of the tree, it is possible to measure the diameter of the tree at two different locations, e.g., at height h3 and at height h4 above and below the horizontal plane. These heights can coincide with the elevational directions used for the distance measurement and for measuring the length of the entire tree, but are not necessarily the same, as is evident from FIG. 1. The calipering is done where it is deemed most suitable. The program in the computer 7 calculates the complete dimensions of the tree. The program can also provide a statement of one or more suitable uses for the felled log in accordance with a preprogrammed package of conditions. If the instrument is directed at a large angle to the horizontal plane, a section through the tree in the aiming plane will have the shape of an ellipse. The program in the computer 7 can of course, when computing the diameter of the tree, take into consideration the ellipse shape of the section.

In order to obtain an even more accurate quality grading, the computer 7 can be programmed to ask a series of questions of the operator via the display unit of the type: "Is the tree stem straight?", "Is the tree generally free of knots?" and the like. The computer program uses the answers to these questions to make a judgement of the suitable use for the tree.

Figure 5:
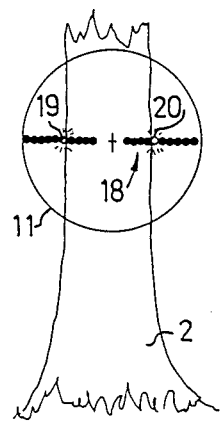
FIG. 5 shows schematically a tree and a view through the sight in a second embodiment of the instrument according to the invention.

FIG. 5 shows an alternative embodiment of a row of LED's 18. It comprises LED's placed across the entire field 11 of the sight, possibly with the exception of of a small area in the center, as shown in FIG. 5. When operating the control unit 9, the computer 7 can be programmed to alternately advance the lighting of an LED towards the boundary line of the tree from one side and the other until both of the points of lights 19 and 20 are at either boundary line. The reference light point is thus also moved in this case.

In both of the embodiments is FIGS. 3 and 5, instead of only one LED being lit at the boundary line, the entire row of LED points can be lit either from the outside inward towards the boundary line or from inside the tree out towards the boundary line.

Instead of having, as is shown in FIG. 3, a row of LED's lit in sequence, it is possible to have, in addition to a fixed reference diode 14, a single LED 15 which can be moved laterally mechanically by means of a screw or a slide for example. Arrangements for such displacements are well-known and therefore need not be shown separately here. The position of the displaceable LED is sensed in a conventional manner and is converted into a digtal signal which is fed into the computer 7.

Essential to the invention is not the mechanical arrangement of the points of light itself, but the principle of determining the horizontal angular distance to the tree by lining up in the sight two relatively displaceable points of light, which the operator can maneuver so that they appear to lie against the tree in the field of view of the sight. This can be accomplished in other ways than those described above, for example by optical displacement with a rotatable glass plate in the beam path, etc.

The mathematical consequences of the tree having at least approximately a circular cross section, can be compensated for in the computer 7 program to obtain a correct distance measurement to the tree as a starting point for determining the height of the tree and for determining the tree diameter.

The instrument can also be provided with a horizontal angle sensor 16. This can be of the type for example which senses the earth magnetic field and which is described in U.S. Pat. No. 4,295,201. By providing the instrument with this sensor, it is possible to map the area where the forest inventory is being made at the same time as the trees are measured. The operator sets up his instrument and makes a first reference measurement against a selected prominent object in the vicinity. The horizontal angular position of this reference measurement is stored as a reference horizontal angle for all measurements of trees made from the same point. If the distance and the vertical angle to the reference object are also measured, the operator can by first measuring against the reference object after every movement of the instrument obtain an automatic calculation of the placement of the tree in the area by the computer 7 also being programmed to make this calculation.

We claim:

1. A device for measuring a dimension of a substantially vertical cylindrical object at a distance from said object, comprising:
    an aiming instrument for sighting various points along said object, said aiming instrument including a plumb line angle sensor, an electronic distance meter and a horizontal angle device for measuring a horizontal angular distance between opposite edges of said object at a predetermined height along said object; and,
    a computing unit coupled to receive a distance signal from said distance meter, a signal from said angle sensor, and a signal from said horizontal angle device, said computing unit computing a diameter of said object at said predetermined height from information supplied by said signals.

2. A device according to claim 1, wherein the horizontal angle device for determining the angular distance comprises at least two illuminated points of light placed in the aiming instrument so that a beam path from them is arranged to pass through an occular of the aiming instrument as though it came from an image plane of the object to be measured, and that at least one of the at least two points of light is movable relative to the other along a horizontal line in the sight by an external control to place one of the at least two points of light at individual boundary lines which separate the object and the surroundings.

3. A device according to claim 2, wherein a plurality of points of light, each controllable to act as a point of light, are placed closely in a row, and that a manually operated control device is disposed to turn on and off the points of light in a predetermined pattern.

4. A device according to claim 2, wherein at least one of the points of light is placed on a mechanically displaceable unit.

5. A device according to claim 1, wherein said electronic distance meter, is of a direct measuring type, coupled to the computing unit to compute distance measurements to the object.

6. A device according to claim 1, further comprising a horizontal angle sensor for determining a horizontal angular position of the device in relation to a reference position in space when measuring said object, and the computing device computes the position of the object on a map of a measuring area based on measurements of distance to a reference object and horizontal angular distance and measured distance to each measured object.

7. The device of claim 1 wherein said computing unit computes the diameter D of said object according to $$D = 2 * d1 * \sin \gamma / 1 - \sin \gamma$$

where
   d1 is the distance from said object to said aiming instrument, and
   $\gamma$ is said horizontal angular distance.

* * * * *